Dec. 11, 1951     R. A. SANDBERG     2,578,020
FILTER CARTRIDGE CONTAINER
Filed March 26, 1946     3 Sheets-Sheet 1
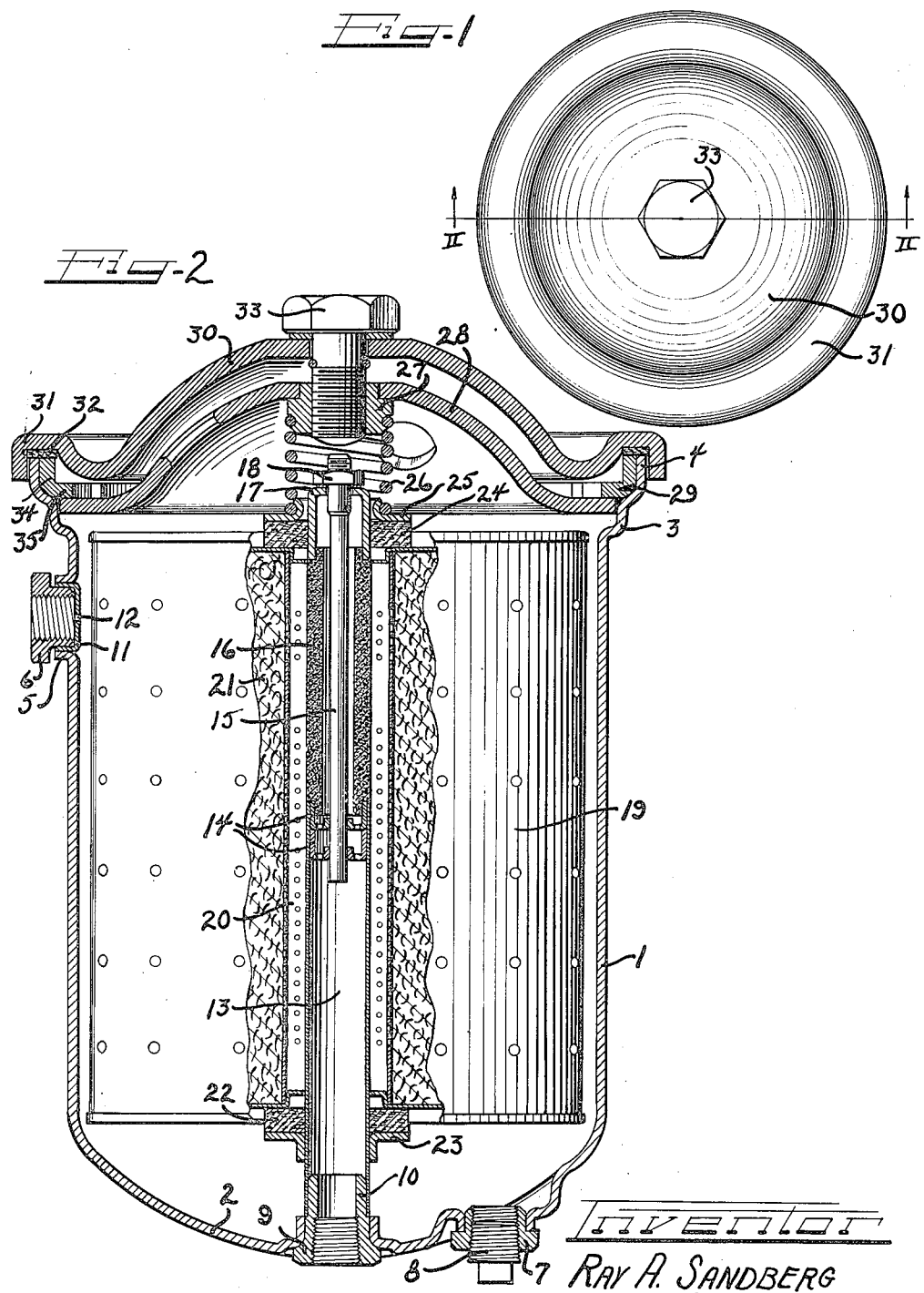
Inventor
Ray A. Sandberg Dec. 11, 1951     R. A. SANDBERG     2,578,020
FILTER CARTRIDGE CONTAINER
Filed March 26, 1946     3 Sheets-Sheet 3
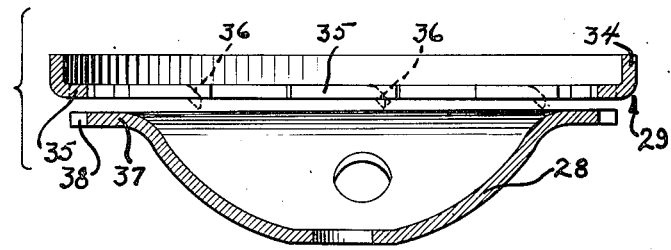
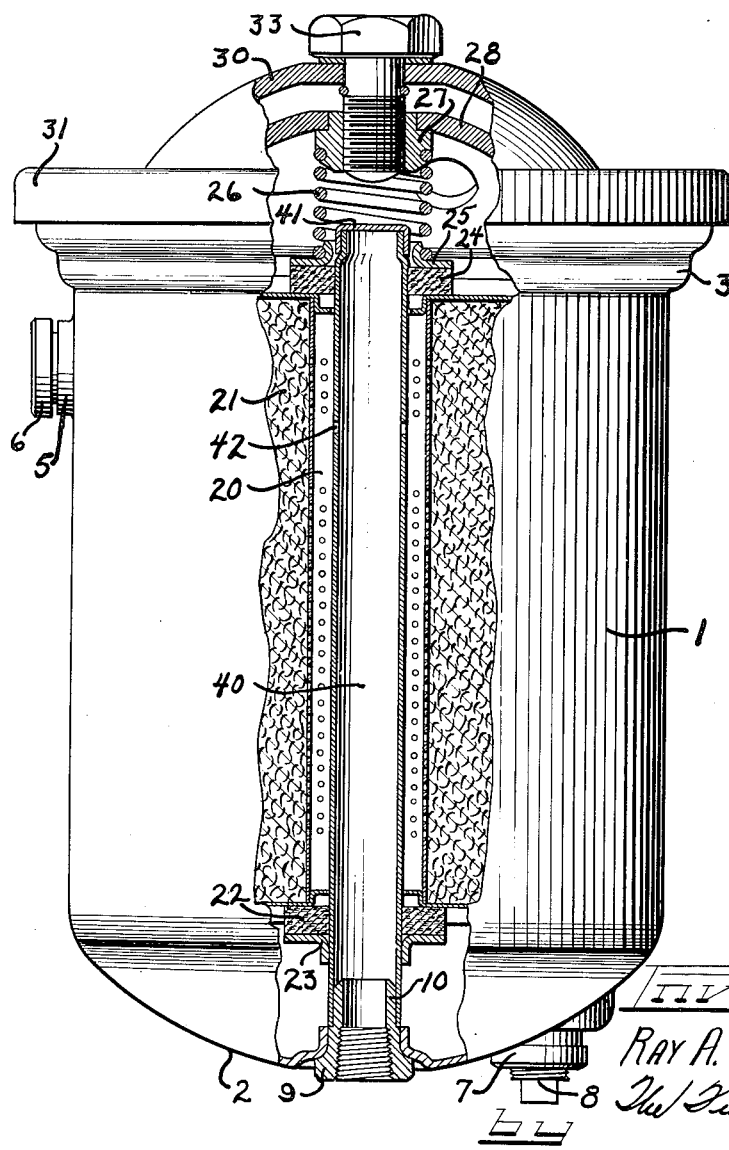

Patented Dec. 11, 1951

2,578,020

UNITED STATES PATENT OFFICE 2,578,020

FILTER CARTRIDGE CONTAINER

Ray A. Sandberg, Waukegan, Ill., assignor to Houdaille-Hershey Corporation, Detroit, Mich., a corporation of Michigan Application March 26, 1946, Serial No. 657,121

4 Claims. (Cl. 210—183)

This invention relates to improvements in a filter cartridge container, and more particularly, to a container for the reception of a substantially standard filter cartridge to provide an oil filtering assembly of the character highly desirable for use in association with internal combustion engines for the cleansing of the lubricant oil used with the engine, although the invention may have other uses and purposes as will be apparent to one skilled in the art.

In the past, many and various oil filter assemblies have been developed for disposition beneath the hood of an automotive vehicle and connection in the oil line of the vehicle. When in such locations, at times there is a considerable pressure developed within the filter assembly, and consequently the casing of that filter assembly has to be of sufficient strength to withstand that pressure. Again, there must be no rattling of any part of the assembly. At the same time, there must be an arrangement such that the filter cartridge may be changed expeditiously and with a minimum amount of effort. Difficulty has heretofore been experienced in providing a casing capable of furnishing the above desiderata and at the same time be produced sufficiently economically for commercial purposes.

As to the economy of production, which is the major factor in this industry, extreme difficulty has been experienced in the past in making the casing sufficiently strong to withstand the pressure applied when the top of the casing is mounted in position and clamped upon the body. Frequently, an over-zealous operator using a wrench for this purpose would clamp the cover upon the body of the casing so tightly as to deform the body wall and thus establish a faulty connection. Injury has also resulted by virtue of the fact that the center tube which extends upright through the inside of the cartridge was injured by this same clamping force, and had to be made sufficiently strong to withstand such clamping force which, of course, added to the cost of production. Difference in size of fittings, joining of various parts, facing operations, spinning and beading operations, and the like all added to the cost of filter casings heretofore known. In many instances, these filter casings were not constructed to accommodate a cartridge containing an extremely fine filtering medium and not provided with any means to prevent a part of the filter medium leaking from within the cartridge passing into the lubricant line.

With the foregoing in mind, it is an important object of the instant invention to provide a filter casing which is so constructed as to permit a minimum gauge of metal in the body portion, and no deformation or special shaping of the body portion is necessary to provide the adequate strength.

Another object of the invention resides in the provision of a filter casing so arranged that the force created by the clamping of the cover in position upon the body is kept entirely away from the center post inside the casing.

It is also an object of this invention to provide a filter casing so arranged that the force resulting from clamping the cover in position upon the body is transferred to the circumferential part of the cover, the circumferential part of the body and a locking ring reinforcing the upper portion of the body.

Another feature of the instant invention resides in the provision of a filter casing employing the use of a novel locking plate and an associated locking ring for holding the filter element firmly in position within the casing against rattling.

Another feature of the invention resides in the provision of a filter casing employing the use of a locking ring adjacent the open end of the casing to create a wider gasket seal for the cover without thickening or deforming the body wall of the casing in any manner.

Also an object of this invention is the provision of a filter casing embodying a number of internal parts and fittings, and in which all joints of the entire casing assembly may be secured by a brazing operation or the equivalent, and may be secured at one time in a single pass through the brazing furnace.

A further object of the invention resides in the provision of a filter casing employing inlet and outlet fittings of substantially the same size to thereby reduce the manufacturing cost of such fittings.

Still another object of this invention resides in the provision of a filter casing for receiving a filter cartridge in which the center tube of the casing may be made of very light wall construction because the arrangement is such that no load is imposed upon this center tube and there is no necessity of tapping the tube or deforming it otherwise to establish any connection with it of another part.

Another feature of this invention is to provide a filter casing employing a novel locking plate and locking ring construction of such character that no metal is wasted in the production of these separate parts, both of them being formed from an initially integral blank.

Still a further object of the invention resides in the provision of a filter casing in which no facing operation is necessary at the mouth end of the casing until after the casing has been completely formed, whereupon the facing operation is extremely simple to accomplish.

While some of the more salient features, characteristics and advantages of the instant invention have been above pointed out, others will become apparent from the following disclosures, taken in conjunction with the accompanying drawings, in which:

Figure 1 is a plan view of a filter casing embodying the improvements of the instant invention;

Figure 2 is an enlarged vertical sectional view of the casing structure of Figure 1, taken substantially as indicated by the line II—II of Figure 1 looking in the direction of the arrows, with parts shown in elevation, and illustrating a filter cartridge in position within the casing, portions of the cartridge being broken away;

Figure 4:
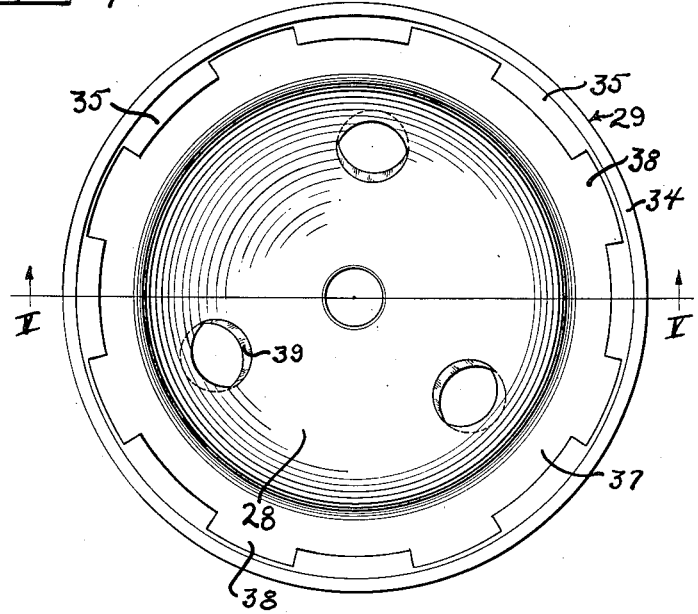
Figure 4 is a plan view of the locking plate and locking ring, partially completed, and illustrating a step in the formation of these parts.

Figure 5 is a vertical sectional view taken substantially as indicated by the line V—V of Figure 4, also illustrating steps in the process of making the locking ring and locking plate; and Figure 6 is a part vertical sectional, part elevational view of a filter casing containing a cartridge, the filter casing being in most respects the same as that illustrated in Figures 1 and 2, but embodying a somewhat different form of center tube.

Figure 3:
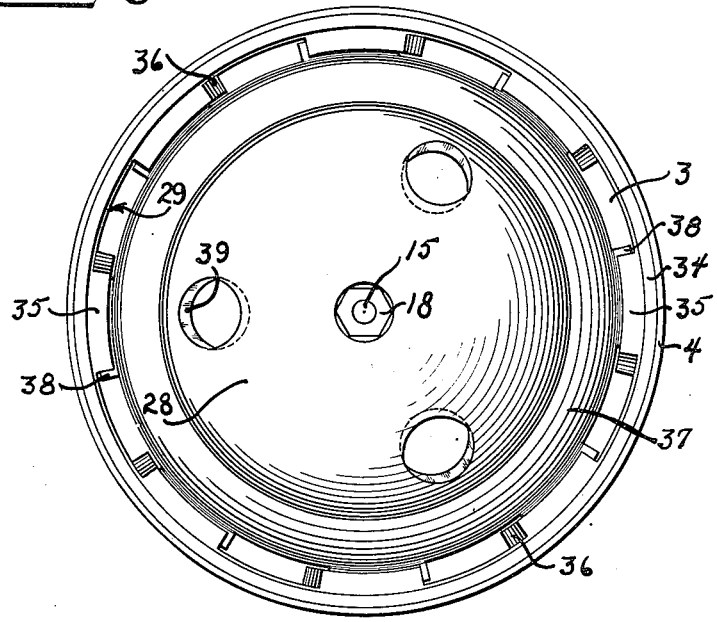
Figure 3 is a plan view of the structure of Figure 2 with the cover removed.

As shown on the drawings:

In that illustrated embodiment of this invention seen in Figures 1, 2 and 3, there is shown a casing 1 having a substantially rounded bottom 2. The casing is stepped outwardly at its upper margin as indicated at 3 to provide a cylindrical mouth margin 4 of greater diameter than the body portion of the casing. In the upper portion of the body, the casing is outwardly flanged as indicated at 5 to define an inlet opening in which is inserted an inlet fitting 6 to which the end of the lubricant line may be threaded. At the bottom of the casing is a similar formation to accommodate a drain fitting 7 normally closed by a plug 8. Centrally of the bottom, the casing is inwardly flanged to accommodate an outlet fitting 9 having an inwardly extending cylindrical shank 10 of reduced diameter. With the exception of this shank portion on the outlet fitting, all the fittings 6, 7 and 9 are of the same size to thus add to the economy of manufacture. It will be noted, however, that the inlet fitting is preferably provided with a stamping 11 having a small orifice 12 therein to aid in maintaining proper delivery of lubricant within the casing and keep the pressure in the lubricant line at the correct degree. All of the fittings as well as the stamping 11 are preferably secured to the casing by a brazing operation such as copper brazing.

At this point, it may be mentioned that all joining of parts in connection with the instant invention, where the parts are intended to remain joined, and not be separated for servicing of the filter assembly, are preferably united by way of copper brazing. It will be understood, of course, that welding might also be relied upon or other equivalent operation, but for economy in manufacture, copper brazing is the preferred method of joining parts.

Inside the casing is a center outlet tube 13 which seats over and is brazed to the shank 10 of the outlet fitting 9. This outlet tube 13 may be made of very light wall construction, for example, 0.028 inch in thickness, because the tube is not tapped in any manner, and no more than a negligible load is placed upon this tube in the present invention. The tube 13 does not extend entirely through the casing, but terminates in the central region of the casing in that embodiment seen in Figure 2 of the drawings, and in the upper end of the tube are a pair of superposed cup-like stampings 14 brazed to the inside wall of the tube. These stampings have apertures in the bottom to permit lubricant to flow down the tube, and each stamping is provided with a hub portion to accommodate the lower part of a vertical rod 15 which is also brazed to the hubs of the stampings 14. A very fine mesh tubular filter element 16 is disposed on the upper end of the tube. As seen in Figure 2, the filter 16 has offset end portions so that while a margin may extend within the upper stamping 14, the filter may remain of the same outside diameter as the tube 13. The filter 16 may be in the form of an extremely fine mesh screen arrangement or might quite satisfactorily be a powdered metal filter, as illustrated. Seated over the upper end of the filter 16 is an inverted cup-like cap member 17 having an aperture therein through which the upper portion of the rod 15 extends. The upper portion of this rod is threaded to accommodate a small nut 18, and a lock washer or the equivalent may be disposed between the nut and the cap 17. Thus, the filter 16 is maintained in assembled relationship with the tube 13. Obviously, the release of the nut 18 permits the cap 17 and filter element 16 to be removed from the casing so that the filter 16 may be cleansed if necessary by a simple blowback process.

A filter cartridge 19 of any satisfactory type may be dropped into the casing over the center tube 13 and filter 16, such cartridges being centrally apertured for this purpose.

In the illustrated instance the filter element 19 includes an external perforated casing, a perforated center tube 20, with a mass of filtering material 21 disposed therebetween. Of course, the ends of the casing are both sealed. The filter element is merely dropped in position around the center tube structure of the casing and the lower end of the unit seats upon a gasket 22 resting upon a suitable gasket support 23 brazed to the center tube 13. The upper end of the filter element is sealed by means of a gasket 24 held in position by a collar 25 carried on the end of a coil spring 26, the upper end of which engages with an internally threaded stud 27 secured to a dome-shaped locking plate 28. This locking plate is removably engageable with a locking ring 29 and when so engaged the spring 26 presses downwardly upon the collar 25 and gasket 24 to hold the filter element in the casing against rattling and to prevent any escape of lubricant through the ends of the inside tube 20 of the filter element.

It should be noted that the only load the center tube 13 in the casing has to carry is that very minute load caused by the tightening of the nut 18 to hold the filter element 16 in proper position, and the relatively small load presented by the spring 26 urging the filter element downwardly against the gasket 22 on the gasket holder 23. The total load, therefore, on the center tube of the casing is practically negligible, and far less than the load commonly disposed upon center tubes in filter assemblies heretofore known.

A dome-shaped cover 30 provided with an integral annular portion 31 in the nature of an inverted channel which carries a gasket 32 that seats upon the upper end of the casing is held in position by means of a stud bolt 33 engaged in the internally threaded stud 27 in a well known manner. It is obvious that the stud bolt 33 must be tightly screwed into place so as to firmly clamp the cover on the casing and effect a positive lubricant-tight seal therebetween. However, it will be noted that all of the force resulting from the tightening of the bolt 33 is transferred to the circumferential part of the body and locking ring 29, and none of this force is in any manner transmitted upon the center tube 13 either directly or indirectly because the force is kept entirely away from the filter element 19 and associated parts.

With reference more particularly to Figures 3, 4 and 5, it will be noted that the locking ring, generally indicated by numeral 29, is angular in shape and includes an upright cylindrical portion 34 brazed to the inside of the cylindrical margin 4 of the casing. Integral with this cylindrical part 34 is a number of relatively wide and evenly spaced apart teeth or projections 35 which extend inwardly substantially horizontally. One end portion of each tooth 35 is struck downwardly as indicated at 36 and the top portion beveled.

The locking plate 28 has a substantially horizontally extending part 37 which has a plurality of teeth or projections 38 extending outwardly therefrom and equally spaced apart. These teeth 38 are similar to the teeth 35 on the locking ring, but are of less width. When the locking plate is placed in position with the collar 25 contacting the gasket 24, the plate is pressed downwardly against the action of the spring 26 until the teeth 38 on the plate pass through the spaces between the teeth 35 on the locking ring. Then the locking plate is revolved to locate the teeth 38 underneath the teeth 35, the turned down end portions 36 acting as stop members to limit the rotation, and the locking plate will be held firmly in position with the spring 26 urging the gasket 24 against the filter element 19, and the teeth 35 of the locking ring provide the proper reaction. Thus, the filter element is held firmly in position against rattling, the ends of this element are sealed, and the locking plate is prevented from rattling or slipping all by virtue of the pressure of the spring 26. When it is desired to remove the filter element, it is a simple expedient to press downwardly upon the dome portion of the locking plate and rotate it in the reverse direction until the teeth 38 pass out through the spaces between the teeth 35 on the locking ring.

The provision of the locking ring 29 is one of the important features of the instant invention. It will be noted that this ring terminates flush with the open end of the casing and together with the end of the casing provides a wide gasket seat without the necessity of deforming, beading, rolling or otherwise shaping the margin 4 on the casing. It should be especially noted that with this construction no facing operation is necessary until after the locking ring has been brazed in position. It is then an extremely simple operation to face simultaneously both the edge of the locking ring and the edge of the part 4 of the casing which is flush therewith. Such a facing operation provides an even and smooth gasket seat all the way around the open end of the casing. Not only does the locking ring accomplish the foregoing advantages, but another important advantage is that it provides additional strength at the mouth end of the casing and thus permits the casing itself to be made of relatively thin and economical material, for example, a metal of 0.045 inch in thickness being entirely satisfactory. It will be noted that the portion 4 of the casing wall and the upstanding part 34 of the locking ring carry all of the load resulting from the tightening of the bolt 33 when the cover 30 is clamped into position.

Another important feature in the manufacture of the instant invention resides in the fact that all permanent connections of the parts may be done by the same type of brazing and at the same time. That is, the fitting 6 together with its stamping 11 may be joined with the flange 5 on the casing, the fitting 7 joined with its flange, the fitting 9 joined with its flange, the tube 13 joined to the part 10 of the fitting 9, the stampings 14 joined to both the tube 13 and the rod 15, the locking ring 29 joined to the upper part 4 of the casing, and the gasket holder 23 joined to the outside of the tube 13 all in one pass through the brazing furnace. The fact that all these connections may be accomplished in a single pass through the furnace adds materially to the economy of manufacture and greatly facilitates the assembly of the casing.

Another highly economical step in my novel method of making a filter holding casing resides in the manner of manufacturing the locking plate 28 and locking ring 29. These parts are both made from the same piece of material, and in the manufacture of these parts there is no waste of material with the single exception of the apertures 39 in the dome portion of the locking plate and the central aperture to accommodate the bolt 33.

At the start, a single blank of stock is drawn to substantially the position seen in Figure 4. In this figure, it must be understood that the locking plate 28 is in reverse position, or inverted from the showing in Figure 3. After the drawing operation, the locking plate is severed from the locking ring in a manner to define the teeth 38 on the plate and the teeth 35 on the ring. Simultaneously with this operation or immediately thereafter, the holes 39 may be punched in the dome portion of the locking plate. After that operation, with the parts now appearing substantially as seen in Figure 5, a restrike is made upon the locking plate 28 to slightly reduce its diameter so that the teeth 38 will pass freely through the spaces between the teeth 35 on the ring. The center hole to accommodate the bolt 33 is preferably punched after the restrike operation. The locking plate is then complete.

After the locking plate has been punched from the ring, like end portions of the teeth 35 are struck downwardly as indicated by dotted lines in Figure 5 and the upper corner portions beveled or sheared off. The ring is then complete.

When in use, the so constructed locking plate is, of course, inverted so that the dome portion thereof is uppermost. From this description, it can be seen that the manufacture of the locking plate and locking ring is extremely simple, economical, and there is practically no waste of material.

My novel method of making the filter cartridge container is more fully set forth and claimed in my copending application for Letters Patent entitled "Locking Ring and Plate Assembly and Method of Making Same," filed December 5, 1947, Serial No. 789,886.

In connection with the filter container seen best in Figure 2, it will be noted that with the use of the fine mesh inside filter 16 substantially any type of filter cartridge may be used, even a cartridge including filtering material such as fuller's earth, and there will be no danger of any of that filtering material passing into the center outlet tube 13. Even with commonly known filter cartridges employing cotton filter material, there will be no danger of cotton strands or fibers that may escape through the apertures in the center perforated cylinder 20 of the filter element entering the lubricant line through the outlet of the casing.

In some instances, however, as a matter of economy, it may be desired to dispense with the fine mesh filter 16 and in that event a construction such as illustrated in Figure 6 might be utilized. All of the parts in Figure 6 with the exception of the center tube are the same as above described and correspondingly numbered. In this instance, a center tube 40 is brazed over the part 10 of the outlet fitting 9. This center tube extends upwardly clear through the gasket 24 on the top of the filter element and the upper end may be closed by a simple form of cap 41 which may be brazed to the tube. Inside the filter element, the tube may be provided with one or more apertures 42 through which the filtered lubricant may enter the tube. If the filter element itself embodies a casing structure of such type that it will hold the filter medium per se entirely within the casing, the structure of Figure 6 will operate quite satisfactorily and is a more economical structure than that shown in Figure 2. However, the structure of Figure 6 in most cases may not be entirely satisfactory for use with an extremely fine filtering medium such as fuller's earth.

From the foregoing, it is apparent that I have provided a novel and highly efficient filter holding container and a novel method of making the same. The filter holding container may be made of relatively light material, may be extremely economically manufactured by virtue of the use of light material, by virtue of the manner of accomplishing all joining operations in a single pass through the furnace, and by the transference of the heavier forces away from the center tube. Also, it will be noted that in the formation of certain parts of the container no wasteage of material results and difficult facing operations are entirely eliminated. The resultant container is easy to manipulate and extremely long-lived.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an oil filter container, a casing, a center outlet tube therein around which a filter cartridge may be positioned, a gasket around the lower part of said tube on which the cartridge may seat, a locking ring secured inside the mouth of said casing, a locking plate engageable with said ring, resilient means carried by said plate to effect a seal between the cartridge and said center tube by forcing the cartridge against said gasket, a cover for the casing, and means for clamping said cover to said locking plate and thereby transfer the force of the clamping to said locking ring and away from said center tube, said casing having an inlet opening leading to the space outside a cartridge and an outlet opening communicating with said center tube.

2. In an oil filter container, a casing made of relatively light stock and having an open upper end with the casing wall terminating abruptly, a locking ring secured to the inside of the casing wall and terminating flush with the upper casing edge, an inwardly extending portion on said ring having a plurality of spaced teeth, a locking plate having a plurality of spaced teeth sized to pass through the spaces between the ring teeth upon rotation of said plate, one end of each of the ring teeth being turned downwardly to limit the rotation of said plate, and a compression spring carried by said plate and compressible between said plate and a filter cartridge placed in said casing, said casing having inlet and outlet ports for oil passing through the casing.

3. In an oil filter container, a casing, a center outlet tube therein around which a filter cartridge may be positioned, a seat adjacent the lower end of said tube for the cartridge, a locking ring secured inside the mouth of said casing, a locking plate engageable with said ring, resilient means between said plate and the cartridge to force the cartridge downwardly against said seat and effect a seal therebetween, said resilient means exerting force against said cartridge around said outlet tube, a cover for the casing, and means to clamp said cover to said locking plate, said casing having an inlet port leading to the space outside the cartridge and an outlet port communicating with said center tube.

4. In an oil filter container, a casing, a center outlet tube therein around which a filter cartridge may be positioned, a seat adjacent the lower end of said tube for the cartridge, a gasket on said seat on which the cartridge rests, a locking ring secured inside the mouth of said casing, a locking plate engageable with said ring, a spring carried by said plate and loosely surrounding the upper end of said outlet tube, sealing means around said tube beneath said spring to bear against the top of the cartridge, said spring forcing said sealing means against the cartridge which in turn is forced against said gasket, and a cover for said casing connectable to said locking plate, said casing having an inlet port leading to the space outside the cartridge and an outlet port communicating with said center tube.

RAY A. SANDBERG.

REFERENCES CITED

The following references are of record in the file of this patent:

UNITED STATES PATENTS

| Number | Name | Date |
| --- | --- | --- |
| 685,975 | Danziger et al. | Nov. 5, 1901 |
| 1,761,924 | Kamrath | June 3, 1930 |
| 2,018,022 | Johnson | Oct. 22, 1935 |
| 2,123,809 | Seitz | July 12, 1938 |
| 2,158,512 | Layte et al. | May 16, 1939 |
| 2,212,647 | Nugent | Aug. 27, 1940 |
| 2,316,729 | Tryon | Apr. 13, 1943 |
| 2,333,890 | Russell | Nov. 9, 1943 |
| 2,379,582 | Kracklauer | July 3, 1945 |